(12) United States Patent
Griessbach

(10) Patent No.: US 6,882,197 B2
(45) Date of Patent: Apr. 19, 2005

(54) METHOD FOR GENERATING AN OUTPUT CLOCK-PULSE AND A CORRESPONDING CLOCK-PULSE GENERATION CIRCUIT

(75) Inventor: Gunter Griessbach, Gelenau (DE)

(73) Assignee: Siemens Aktiengesellschaft, Munich (DE)

( * ) Notice: Subject to any disclaimer, the term of this patent is extended or adjusted under 35 U.S.C. 154(b) by 44 days.

(21) Appl. No.: 10/362,514

(22) PCT Filed: Aug. 22, 2001

(86) PCT No.: PCT/DE01/03201

§ 371 (c)(1),
(2), (4) Date: Feb. 24, 2003

(87) PCT Pub. No.: WO02/17491

PCT Pub. Date: Feb. 28, 2002

(65) Prior Publication Data

US 2003/0222690 A1 Dec. 4, 2003

(30) Foreign Application Priority Data

Aug. 22, 2000 (DE) ..................... 100 41 331

(51) Int. Cl.⁷ .......................... H03K 3/017
(52) U.S. Cl. .............................. 327/175
(58) Field of Search ............... 327/39, 41, 44, 327/47, 131, 134, 170, 172–176, 227–229, 291, 299

(56) References Cited

U.S. PATENT DOCUMENTS

| 3,571,732 | A |   | 3/1971 | Richardson | 327/237 |
|---|---|---|---|---|---|
| 5,612,973 | A |   | 3/1997 | Gershenfeld | 375/206 |
| 6,060,922 | A | * | 5/2000 | Chow et al. | 327/175 |
| 6,121,805 | A | * | 9/2000 | Thamsirianunt et al. | 327/175 |
| 6,154,076 | A | * | 11/2000 | Hastings | 327/175 |
| 6,198,317 | B1 | * | 3/2001 | Chow et al. | 327/116 |
| 6,504,409 | B1 | * | 1/2003 | Laletin | 327/175 |

FOREIGN PATENT DOCUMENTS

| EP | 0 159 786 | 10/1985 |
|---|---|---|
| EP | 0 183 075 | 6/1986 |
| EP | 0 252 638 | 1/1988 |

OTHER PUBLICATIONS

English Deutsch—Fachausdroecke der Text– und Datenverarbeitung, S. 478.

Cattermole, K., Signale und Wellen, Mathematische Grundlagen, S. 54.

Oppenheim, A., Signale und Systeme, Lehrbuch S. 180, 432.

* cited by examiner

*Primary Examiner*—My-Trang Nu Ton
(74) *Attorney, Agent, or Firm*—Staas & Halsey LLP

(57) ABSTRACT

An output clock-pulse with a variable pulse duty factor is generated from a basic clock pulse that is supplied to a pulse contractor for generating pulses that are synchronized to the clock pulse. The resulting pulses are supplied to a circuit for varying the pulse duty factor corresponding to a ratio between the high-level and low-level of a period of the output clock-pulse.

12 Claims, 3 Drawing Sheets

METHOD FOR GENERATING AN OUTPUT CLOCK-PULSE AND A CORRESPONDING CLOCK-PULSE GENERATION CIRCUIT

CROSS REFERENCE TO RELATED APPLICATIONS

This application is based on and hereby claims priority to German Application No. 100 413 31.5 filed on Aug. 22, 2000, the contents of which are hereby incorporated by reference.

BACKGROUND OF THE INVENTION

1. Field of the Invention

The present invention relates to a generation method for an output clock with a duty ratio, and to a clock generation circuit corresponding to it.

2. Description of the Related Art

Crystal oscillators are used for generation of the output clock, especially at relatively high frequencies. They normally have a duty ratio, a time ratio between the high level and the low level (see page 4, lines 18 and 19 of the originally submitted description) of approximately 1:1.

According to the reference document "Specialist expressions for word processing and data processing—dictionary and glossary", issued by IBM, the expression "duty ratio" means the "ratio of the pulse duration to the period duration of a pulse".

Widely differing signal forms are known from the relevant specialist literature. For example, a so-called "square-wave pulse sequence" is known from "Kenneth W. Cattermole: Signale und Wellen—Mathematische Grundlagen und Anwendungen" which may be translated as "Signals and waves—Mathematical principles and applications", VCH Verlagsgesellschaft, 1998, (page 54; and elsewhere), and a so-called "period square wave" (page 180; and elsewhere) as well as a so-called "symmetrical period square wave" (page 432; and elsewhere) are known from "Oppenheim, Willsky: Signale und Systeme—Lehrbuch" which may be translated as "Signals and systems—Textbook", VCH Verlagsgesellschaft, 1999. The minimum amplitude of such a symmetrical period square wave need not necessarily be less than zero, as described in the textbook; the minimum amplitude—the low level—is frequently equal to, or approximately equal to, zero. However, this corresponds to a simple shift of the otherwise unchanged signal form along the ordinate.

In the terminology of the present application, the expression "duty ratio" means the ratio between the duration of the high level and the duration of the low level of an at least essentially symmetrical periodic square wave. In the terminology of this application, exactly symmetrical period square waves have a duty ratio of 1:1 (see above) since, owing to the symmetry of the square wave, the duration of the high level in fact corresponds exactly to the duration of the low level in one period of such a symmetrical periodic square wave.

Such symmetrical periodic square waves are frequently the output signal from a clock generation circuit, so that the symmetrical periodic square wave represents the clock signal for a circuit or an appliance.

In the prior art, considerable problems frequently occur with regard to inadvertent radio-frequency radiated emissions. Various measures are necessary in order to comply with the legal regulations and/or to avoid disturbing interference.

For example, in the case of personal computers, it is known for the clock generation to be designed such that the frequency is continuously varied by a small amount. If, for example, a crystal oscillator has a nominal frequency of 50 MHz, then, by way of example, its actual frequency is varied in the range between 49.9 MHz and 50.1 MHz. The frequency of the interference spectrum, with the harmonics contained in it, is thus continuously shifted. This results in the interference spectrum being distributed over a wider range, hence resulting in the mean interference power being reduced—in comparison to a fixed frequency. However, the radiated interference power that is emitted is actually constant in a relatively narrow frequency band about one harmonic.

The procedure in the prior art itself leads to a considerably reduction in the mean interference power per frequency. However, this requires the clock frequency to be varied.

In some applications, data transmission methods at a fixed frequency and synchronization methods may be mentioned by way of example, it is not, however, permissible to vary the frequency in such a way. In situations such as these, the method for the prior art cannot be used, by virtue of the system.

SUMMARY OF THE INVENTION

An object of the present invention is to provide a generation method for an output clock, and a clock generation circuit corresponding to it, by which the electromagnetic interference radiation can be reduced without needing to vary the frequency.

For the generation method, this object is achieved by continuously varying the duty ratio. The duty ratio is thus jittered.

In a corresponding manner to this, this object is also achieved by a clock generation circuit having a dock generator for outputting a basic clock, having a pulse shortener, which is arranged downstream from the clock generator, for generating clock-synchronous pulses, and having a duty ratio variation circuit, which is arranged downstream from the pulse shortener, for outputting an output clock with a variable duty ratio.

This is because the interference spectrum is distributed more uniformly between the even-numbered and odd-numbered harmonics of the frequency by the generation method according to the invention and the clock generation circuit according to the invention, in that the ratio of the duration of the high component and the low component in one period, in particular of symmetrical periodic square wave, of the output clock is varied continuously. The interference power level is thus "redistributed" continuously between the individual harmonics. The interference power level is thus reduced, when averaged over time.

The jittering of the duty ratio also has no disadvantageous effect in particular because the output clock is generally divided in a useful circuit to which it is supplied. However, the jittering is corrected once again after the division process.

If frequency constancy is not absolutely essential, the electromagnetic interference radiation can be reduced even further by varying the clock frequency in addition to varying the duty ratio.

In the simplest case, the duty ratio variation circuit is in the form of a monostable multivibrator circuit.

The clock generation circuit may be in the form of a discrete circuit. However, it is preferably in the form of an integrated circuit.

Typical applications of the present invention include clocking of a data transmission device and clocking of a synchronization device.

BRIEF DESCRIPTION OF THE DRAWINGS

These and other objects and advantages of the present invention will become more apparent and more readily appreciated from the following description of an exemplary embodiment, in conjunction with the accompanying drawings of which.

DETAILED DESCRIPTION OF THE PREFERRED EMBODIMENT

Figure 1:
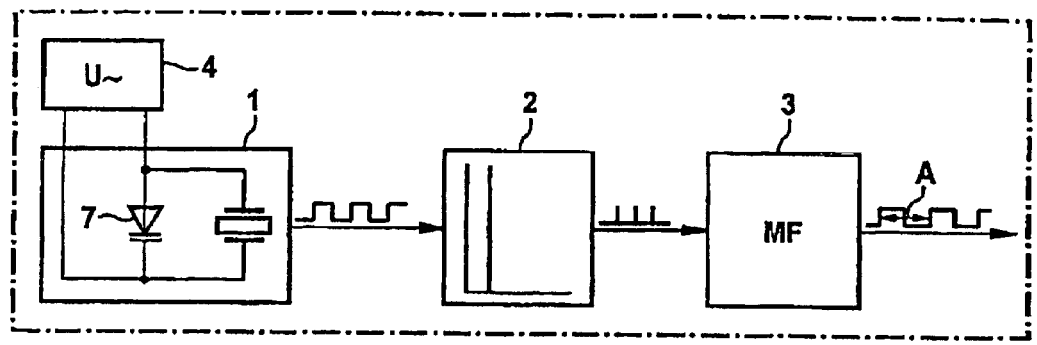
FIG. 1 is a circuit diagram of a clock generation circuit.

Reference will now be made in detail to the preferred embodiments of the present invention, examples of which are illustrated in the accompanying drawings, wherein like reference numerals refer to like elements throughout.

As shown in FIG. 1, a clock generation circuit first of all has a clock generator 1. The clock generator 1 is normally in the form of a crystal oscillator 1. The clock generator 1 emits a basic clock in the form of a symmetrical periodic square wave (see the illustration in FIG. 1) to a pulse generator 2, which is arranged downstream from the clock generator and is used as a pulse shortener.

Triggered by the basic clock, for example by each rising flank of the basic clock, the pulse generator 2 generates a pulse. The pulses are thus synchronized to the clock and are supplied to a duty ratio variation circuit 3 which is arranged downstream from the pulse generator 2. An output clock at a frequency f is output from the duty ratio variation circuit 3.

Figure 2:
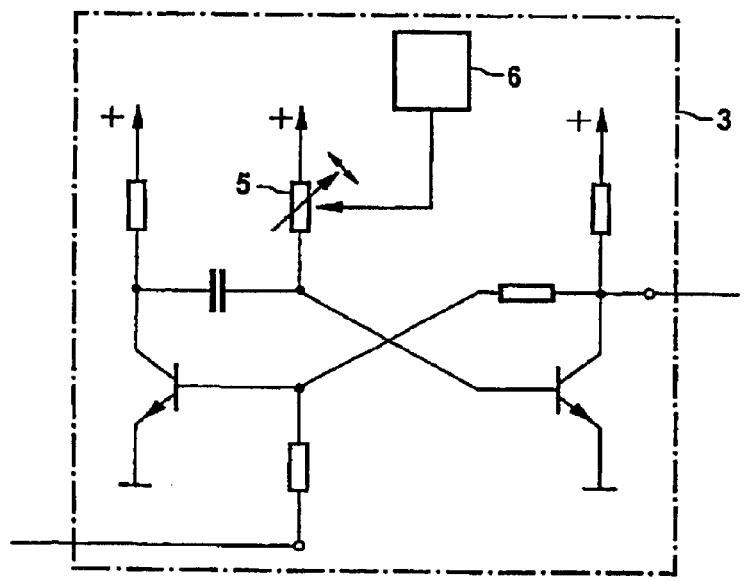
FIG. 2 is a circuit diagram of a monostable multivibrator circuit.

As shown in FIG. 2, the duty ratio variation circuit 3 is in the form of a monostable multivibrator circuit. Multivibrator circuits such as these are generally known, so that the circuit and its method of operation will not be described in detail in the following text. In contrast to conventional monostable multivibrator circuits, the duty ratio variation circuit 3 has a variable load resistor 5, however. The load resistor 5 is varied continuously or in steps by a control circuit 6.

The variation of the load resistor 5 results in a variation in the time in which the monostable multivibrator circuit is locked in the excited state. The duty ratio of the output clock is thus varied, as is indicated by a double arrow A in FIG. 1. The duty ratio, that is to say the time ratio between the high level and the low level, is thus varied, to be precise generally about the value 1:1. For example, it is varied between 0.9:1.1 and 1.1:0.9 or between 0.95:1.05 and 1.05:0.95. The period duration of the output clock is thus not changed by the duty ratio variation circuit 3. However, the duty ratio variation circuit 3 is suitable for varying the duration of the high component and the low component in one period. The duration of the complementary low component and high component is obtained from the period duration minus the duration of the high component or low component, respectively.

If the clock generation circuit is used in a data transmission device, that is to say the output clock is used for clocking the data transmission device, the frequency of the output clock must be constant. The same is true if the clock generation circuit is used in a synchronization device, that is to say the output clock is used for clocking the synchronization device. In this case as well, the output clock must be at a constant frequency. However, other applications are also feasible, for example for the clock supply for microcomputer and microcontroller systems.

If, in contrast, there is no requirement for frequency constancy, the clock generator 1, as indicated by dashed lines in FIG. 1, may also have an associated frequency variation circuit 4. The frequency variation circuit 4 allows the clock frequency of the output clock to be varied in this situation. The clock frequency of the output clock can be varied, for example, by the frequency variation circuit emitting a relatively low-frequency AC voltage to a capacitance diode 7 which is connected in parallel with the frequency generator 1. In consequence, the oscillation frequency of the crystal oscillator 1 is then varied.

The duty ratio variation circuit 3 described above is in an analogous form, since it is formed on the basis of the monostable multivibrator 3. However, it could also be formed using digital technology.

The clock generation circuit according to the invention may be in the form of a discrete circuit. However, as is indicated by the dashed-dotted outline in FIG. 1, it is preferably in the form of an integrated circuit.

Figure 3A:
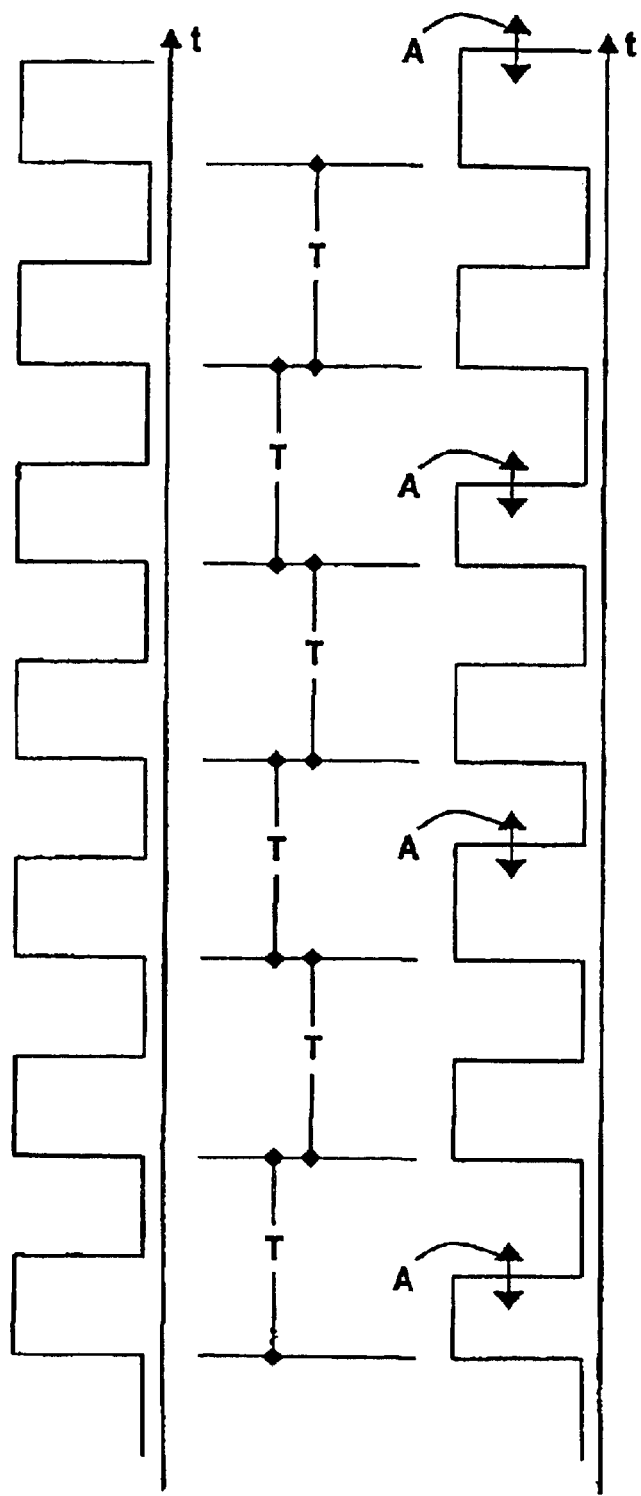
FIGS. 3a and 3b are graphs of the signal waveform of the basic clock and of the output clock which is generated from it.
Figure 3B:
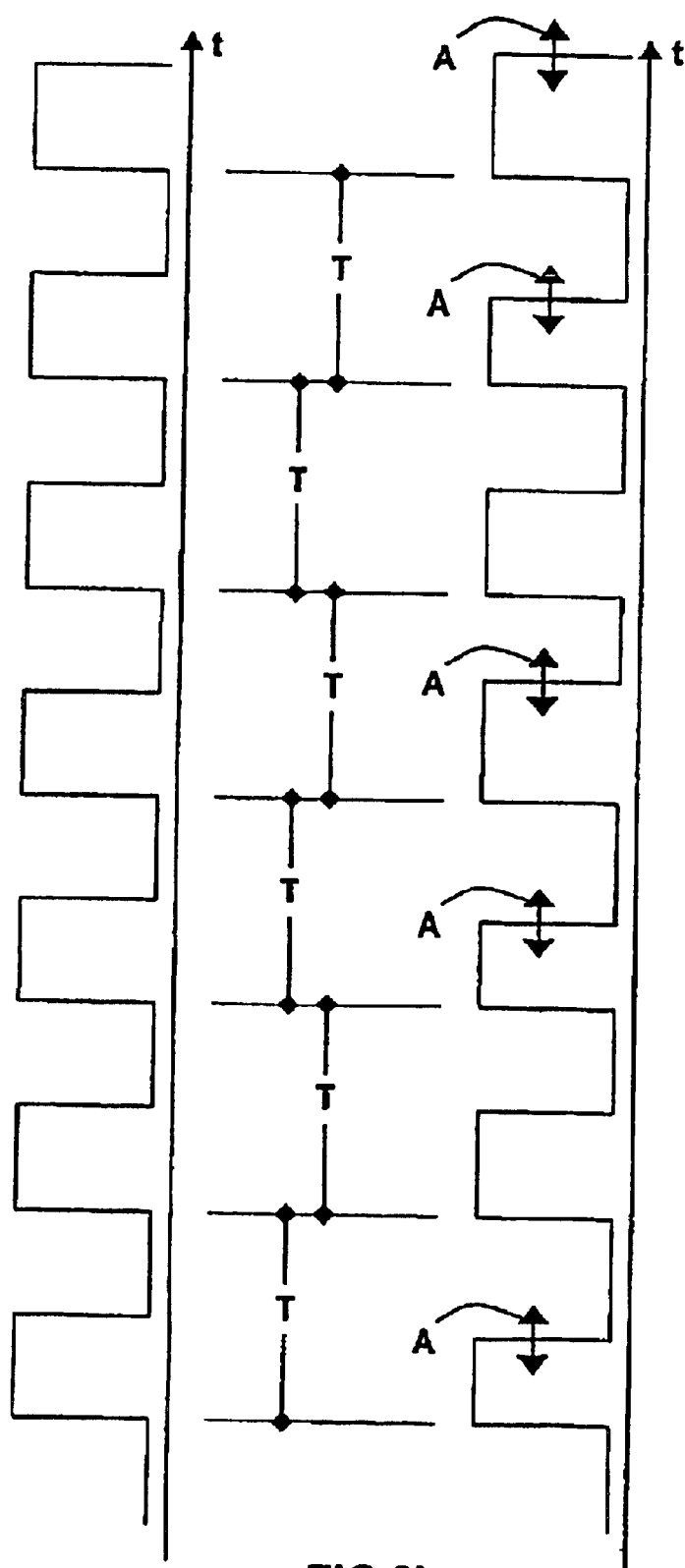

On the left-hand sides, FIGS. 3a and 3b each show the signal waveform of the basic clock with a period of duration T, while the signal waveform of an output clock derived from this is in each case plotted with respect to time t on the right-hand sides of these figures.

The basic clock is produced at the output of the clock generator 1 (see FIG. 1). The basic clock is a symmetrically periodic square wave. The output clock, which is generated from this by the duty ratio variation circuit (see FIG. 1), is also a periodic square wave, although in this case it is no longer symmetrical in the same way as the basic clock, owing to the variation of the duty ratio.

Reading upwards from the bottom, the output clock which is illustrated by way of example in FIG. 3a has duty ratios as follows:

A:B; where A<1 and B>1,

1:1,

A:B; where A>1 and B<1,

1:1,

A:B; where A<1 and B>1,

1:1 and,

A:B; where A>1 and B<1.

The duty ratio is thus varied regularly.

In contrast, FIG. 3b shows an output clock in which the duty ratio is varied randomly. Reading upwards from the bottom, the output clock which is illustrated by way of example in FIG. 3b has duty ratios as follows:

A:B; where A<1 and B>1,

1:1,

A:B; where A<1 and B>1,

A:B; where A>1 and B<1,

1:1,

A:B; where A<1 and B>1 and

A:B; where A>1 and B<1.

The variation of the duty ratio is once again represented by the double arrow A (see FIG. 1) in FIGS. 3a, 3b.

The invention has been described in detail with particular reference to preferred embodiments thereof and examples, but it will be understood that variations and modifications can be effected within the spirit and scope of the invention.

What is claimed is:

1. A method for generating an output clock signal having a high level and a low level from a basic clock signal formed as a periodic square wave, the output clock signal having a duty ratio corresponding to a time ratio between a high level and a low level, comprising:

varying the duty ratio continuously;

jittering the duty ratio; and distributing an interference spectrum uniformly between harmonics.

2. The method as claimed in claim 1, wherein the output clock signal is at a clock frequency, and wherein said method further comprises varying the clock frequency.

3. The method as claimed in claim 1, wherein the output clock signal is used for clocking a device which has to be clocked at a constant frequency.

4. The method as claimed in claim 3, wherein the output clock signal is used for clocking a data transmission device.

5. The method as claimed in claim 3, wherein the output clock signal is used for clocking a synchronization device.

6. A clock generation circuit, comprising:

a clock generator generating an output clock signal with a high level and a low level from a basic clock signal formed as a periodic square wave;

a pulse shortener, arranged downstream from said clock generator generating clock-synchronous pulses; and a duty ratio variation circuit, arranged downstream from said pulse shortener producing an output clock signal and controlling and continuously varying a duty ratio, which is a time ratio between the output clock signal high level and the output clock signal low level of the output clock signal, to jitter the duty ratio and to uniformly distribute an interference spectrum between harmonics.

7. The clock generation circuit as claimed in claim 6, wherein said duty ratio variation circuit is a monostable multivibrator circuit.

8. The clock generation circuit as claimed in claim 7, wherein said clock generation circuit is an integrated circuit.

9. The clock generation circuit as claimed in claim 8, wherein the output clock signal is at a clock frequency, and wherein said clock generation circuit further comprises a frequency variation circuit.

10. The clock generation circuit as claimed in claim 8, wherein said clock generation circuit supplies the output clock signal to a device which has to be clocked at a constant frequency.

11. The clock generation circuit as claimed in claim 10, wherein the device receiving the output clock signal is a data transmission device.

12. The clock generation circuit as claimed in claim 10, wherein the device receiving the output clock signal is a synchronization device.

* * * * *